Feb. 22, 1927.

C. PONTOPPIDAN 1,618,295

MANUFACTURE OF PORTLAND CEMENT

Filed April 3, 1926

INVENTOR
Carl Pontoppidan
BY
Redding, Greeley, O'Shea & Campbell
ATTORNEYS

Patented Feb. 22, 1927.

1,618,295

UNITED STATES PATENT OFFICE.

CARL PONTOPPIDAN, OF HOLTE, COPENHAGEN, DENMARK, ASSIGNOR TO F. L. SMIDTH & CO., OF NEW YORK, N. Y., A CORPORATION OF NEW JERSEY.

MANUFACTURE OF PORTLAND CEMENT.

Application filed April 3, 1926. Serial No. 99,676.

The object of this invention is to make it possible to secure as nearly as practicable uniform quality of Portland cement with particular reference to the time of setting, and incidentally, in one application of the invention, to prevent the unnecessary consumption of energy in the grinding of clinker. It is well understood that the time of setting of cement can be controlled to some extent by the addition of gypsum, which is usually ground with the clinker. If the raw gypsum is replaced by plaster of Paris ($CaSO_4 \cdot \frac{1}{2}H_2O$), the setting time is shortened very considerably. If the raw gypsum is replaced by dead burned gypsum ($CaSO_4$), the setting time is only slightly shortened. Notwithstanding the general knowledge of the effect of adding gypsum to Portland cement for the purpose of controlling the time of setting, the variation in quality as between different parts of the same run of cement or as between different batches or runs, has continued to be a more or less troublesome element.

In a widely extended and intimate study of the subject, in the development of the present invention, it has been determined that the variations in the quality of the cement with added gypsum, notwithstanding the precautions hitherto taken to prevent such variations, is due, in a greater or less degree, even in different parts of the same run, to the conversion of the gypsum to plaster of Paris, whether through heating developed in the grinding together of the clinker and the raw gypsum, or otherwise. It has also been developed that the conversion of gypsum into plaster of Paris is effected by exposure of the gypsum to a temperature in excess of about 125° C. and below a temperature of about 200° C. In the grinding of the raw gypsum with the clinker it has been found that a temperature in excess of about 125° C. is sometimes developed, with a consequent conversion of some of the raw gypsum to plaster of Paris, and in the mixing of the raw gypsum with hot clinker it has been found that some of the gypsum sometimes fails of subjection to a temperature above 200° C. or thereabouts and therefore fails of complete conversion to the condition of burned gypsum and is converted in whole or in part to plaster of Paris. In either case the presence in the mixture of an indeterminate relative quantity of plaster of Paris has resulted in the undesirable variation in quality of the cement, with particular reference to the time of setting. It has also been found, when the clinker and gypsum are ground together, that the time required for grinding and therefore the amount of energy consumed in the grinding, is considerably increased by the presence of plaster of Paris in the mixture, whether due to the conversion of the raw gypsum or otherwise, and that such waste of energy can also be avoided, as well as the variation in the quality of the cement, by preventing the formation of plaster of Paris in the mixture. Accordingly, in accomplishing the purposes of this invention and in carrying on the manufacture of Portland cement, in accordance therewith, the formation of plaster of Paris in the mixture of gypsum and cement material is prevented by preventing the subjection of the gypsum during the formation of the mixture to a temperature between the minimum of about 125° C. and the maximum of about 200° C.

It is obvious that the prevention of the development in the gypsum of the objectionable converting temperature will be accomplished in various ways according to the nature of the materials operated upon and the particular results to be accomplished. When the clinker and raw gypsum are ground together, the development of the converting temperatures can be prevented by keeping the mill suitably cooled during the grinding, as by the application of cooling water to the exterior of the mill. If the gypsum is ground by itself and then mixed with the cement material which has been ground and is still hot, either from the heat of the clinker or from the grinding, the too hot ground material may be cooled as by providing a cooling water jacket for the conveyor by which it is brought to the point of mixing. On the other hand, the gypsum, whether previously ground or not, may be dead burned, that is, may be subjected to a temperature above the maximum of about 200° C., by mixing the same with the clinker while it is still hot from the kiln. Other means of preventing the subjection of the gypsum to the converting temperature in the mixture will readily suggest themselves.

In the accompanying drawings, in which are shown in outline and somewhat diagrammatically different forms of apparatus suitable for the practice of the invention:

Figure 1:
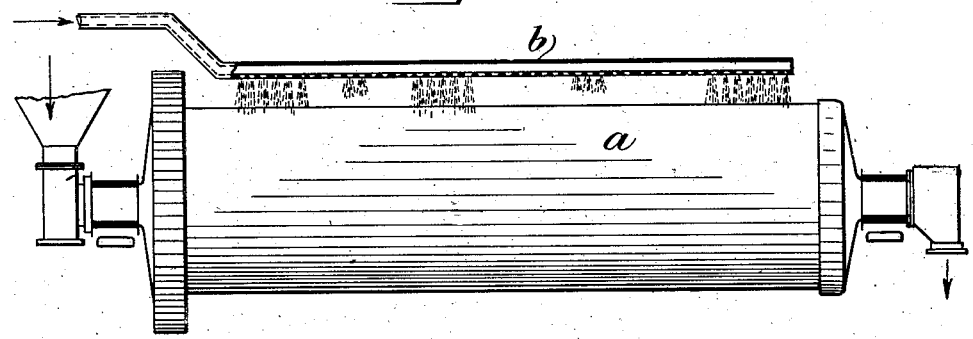
Figure 1 is a view in longitudinal section illustrating the application of a cooling medium to the outside of a mill in which the gypsum and the clinker are ground together.

In the apparatus represented in Figure 1, the raw gypsum and the cement clinker are supposed to be fed together, in proper proportions (usually with the gypsum from two to seven percentum by weight of the cement clinker), into a grinding mill $a$, which may be a tube mill of ordinary construction, provided with grinding bodies as usual. During the process of grinding the gypsum and cement material are thoroughly mixed and the mixture is discharged from the mill as usual. In the operation of mills of this character, in which the gypsum and the cement clinker are ground together, particularly when the clinker is not cold, it has been found that a temperature of about 125° C. is sometimes developed, with a consequent conversion of the gypsum to plaster of Paris, with resulting lack of uniformity in the quality of the completed mixture and with the consumption of considerable energy in the grinding, by reason of the tendency of plaster of Paris to coat the grinding bodies and reduce their efficiency. In order to prevent the development of the converting temperature during the grinding, the mill may be kept cool, as by means of cooling water supplied externally, as indicated at $b$.

Figure 2:
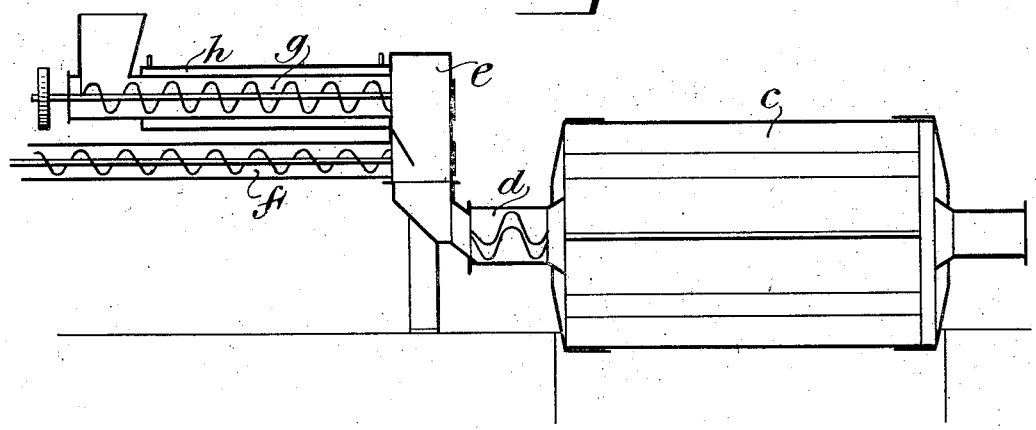
Figure 2 is a similar view illustrating the application of a cooling medium to a conveyor by which the hot ground clinker is cooled before admixture of the previously ground gypsum supplied by another conveyor.

In the apparatus represented in Figure 2, there is a mixing drum $c$, of ordinary construction which receives the previously ground clinker and the previously ground raw gypsum through a conveyor $d$ from a chamber $e$ to which the gypsum is supplied by a conveyor $f$ and the previously ground clinker, assumed to retain too much of its heat, is supplied by a conveyor $g$ which is surrounded by a cooling water jacket $h$ for the purpose of reducing the temperature of the ground clinker, before the admixture with the gypsum, below that at which conversion of the gypsum to plaster of Paris would be effected.

Figure 3:
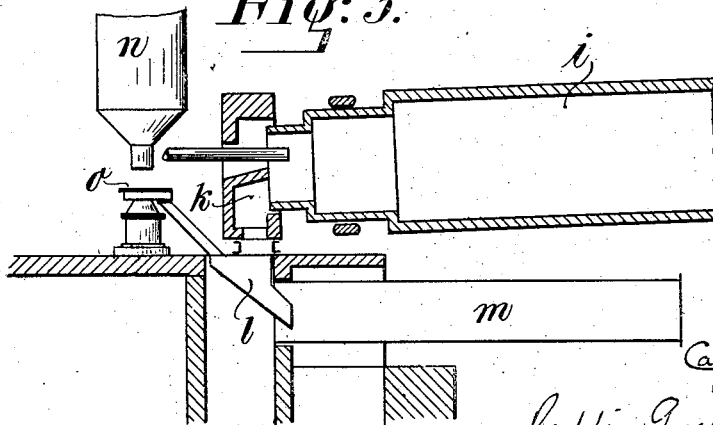
Figure 3 is a similar view illustrating the admixture of the previously ground gypsum with the hot clinker from the kiln to effect the immediate conversion of gypsum to the condition of dead burned gypsum.

In the apparatus shown in Figure 3, the clinker, still hot, is delivered directly from the kiln $i$ through a chamber $k$ and a chute $l$ into a rotary cooling drum $m$, while the raw gypsum is delivered from a bin $n$, in suitable quantity by a feeding table $o$ to the chute $l$ where and in the cooling drum $m$ it is mixed with the clinker and at the same time is heated thereby to a temperature sufficient to convert it to the condition of dead burned gypsum without the formation of plaster of Paris.

It will be understood that the invention is not restricted to any particular form of apparatus.

I claim as my invention:

1. The improvement in the method of making Portland cement with an admixture of gypsum which consists in preventing the subjection of the gypsum during admixture to a temperature such as to effect conversion of the gypsum to plaster of Paris.

2. The improvement in the method of making Portland cement with an admixture of gypsum which consists in preventing the subjection of the gypsum during admixture to a temperature between 125° C. and 200° C.

3. The improvement in the method of making Portland cement with an admixture of gypsum which consists in preventing the subjection of the gypsum during admixture to a temperature of above 125° C.

This specification signed this 25 day of March A. D. 1926.

CARL PONTOPPIDAN.